(12) United States Patent
Abe

(10) Patent No.: US 6,501,557 B1
(45) Date of Patent: Dec. 31, 2002

(54) SMART PERIPHERAL DEVICE FOR TRANSLATING INPUT PRINTER DATA INTO GENERAL-PURPOSE IMPORT-FILE

(75) Inventor: Yasuo Abe, Tokyo (JP)

(73) Assignees: Shima Seiki Mfg., Ltd., Wakayama (JP); Itochu Corporation, Osaka (JP)

( * ) Notice: Subject to any disclaimer, the term of this patent is extended or adjusted under 35 U.S.C. 154(b) by 0 days.

(21) Appl. No.: 08/399,597

(22) Filed: Mar. 7, 1995

(30) Foreign Application Priority Data

Jan. 27, 1995 (JP) .............................................. 7-011215

(51) Int. Cl.[7] .............................................. G06K 15/00
(52) U.S. Cl. ...................................... 358/1.15; 358/1.13
(58) Field of Search ................................. 395/112, 114, 395/110, 275, 325, 500, 280, 284, 309, 311, 821, 828, 840, 841, 853, 854, 880, 881, 882, 891, 892, 800, 885, 890, 200.18, 200.76, 800.01, 800.17, 800.27–800.29, 800.43

(56) References Cited

U.S. PATENT DOCUMENTS

| | | | | | |
|---|---|---|---|---|---|
| 4,004,277 A | * | 1/1977 | Gavril | ......................... | 395/275 |
| 4,754,428 A | * | 6/1988 | Schultz et al. | ......... | 395/200.18 |
| 4,939,670 A | * | 7/1990 | Freiman et al. | ............. | 395/110 |
| 5,065,360 A | * | 11/1991 | Kelly | .......................... | 395/800 |
| 5,113,500 A | * | 5/1992 | Talbott et al. | ............... | 395/325 |
| 5,140,675 A | * | 8/1992 | Okada | .......................... | 395/114 |
| 5,280,585 A | * | 1/1994 | Kochis et al. | ............... | 395/275 |
| 5,307,462 A | * | 4/1994 | Hastings | ..................... | 395/275 |
| 5,418,891 A | * | 5/1995 | Yang | .......................... | 395/114 |

\* cited by examiner

*Primary Examiner*—Gabriel Garcia
(74) *Attorney, Agent, or Firm*—Wenderoth, Lind & Ponack, L.L.P.

(57) ABSTRACT

A smart peripheral device includes a first interface which connects to the printer output port of a first personal computer and receives first printer data of a first printer format from the printer output port of the first personal computer. The smart peripheral device also includes a second interface for connecting to the I/O port of a second computer device containing predetermined application software. The smart peripheral automatically translates the first printer data into a general purpose import file which is compatible with the application saoftware of said second computer device, and outputs the general purpose import file via the second interface.

20 Claims, 2 Drawing Sheets

F I G. 1
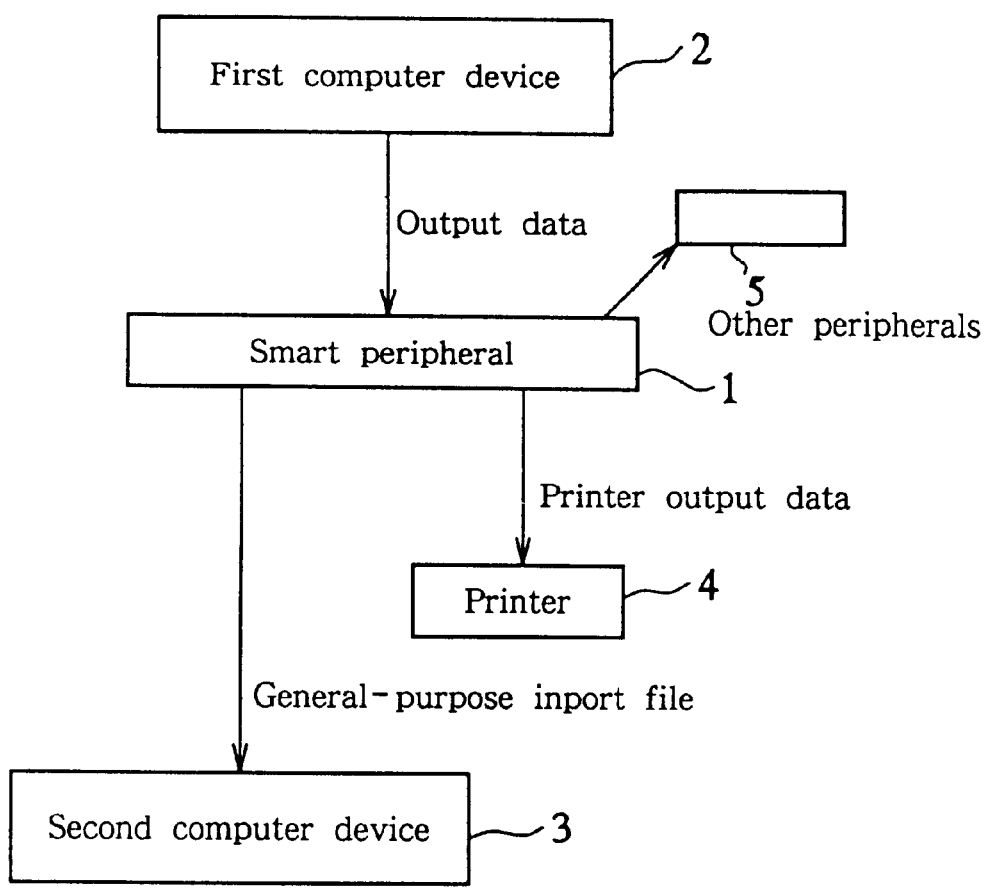

SMART PERIPHERAL DEVICE FOR TRANSLATING INPUT PRINTER DATA INTO GENERAL-PURPOSE IMPORT-FILE

BACKGROUND OF THE INVENTION

1. Field of the Invention

This invention relates to a smart peripheral which, from the output data taken in from an external input device, can generate a general-purpose import file which can be processed with application software in a computer device regardless of the type of application software contained in the computer device.

2. Prior Art

Computer devices, such as super computers, minicomputers, workstations, personal computers, and word processors, have come into wide spread use, and recently, networks for connecting these computer devices to each other have been enthusiastically developed.

Generally, in the fields of word processing, desk top publishing (DTP), and communications between terminals, input data of a personal computer, word processor, workstation, etc. cannot be exchanged without the use of a network environment such as a communications network or local area network.

However, with the conversion to the network system, it is necessary to provide separate application software operating in the network system and to prepare a data file which the application software can process. Even with word processors, etc. having an external input/output file generating capability, the WYSIWYG (What You See Is What You Get) method, which displays the external data prepared with different application software on the screen as a document as output by the printer without being subjected to the restrictions on the system, has not been realized.

Of course, with systems which are not capable of networking, having a document inputted in the past, it is impossible to input data written in a floppy disk with no data interchangeability and data output from a computer device having a different system environment such as the operating system and/or application software directly into another computer device, etc. as it is.

For example, if the floppy disk has no data interchangeability or an interface system for data communications is not provided, and one wants to use the word processing software in a personal computer for input-processing a document prepared with a word processor, the document data could not be taken in. Likewise, a document prepared with a workstation cannot be directly taken in a personal computer having a different system environment, such as the basic device and/or application software, for effecting editing or other processes.

When printing out is made from a computer device, and the printer control language for the printer used is not identical to the printer control language for the application software adopted by the computer device which prepared the printer output data, the printer output data cannot be printed out with the printer.

Thus, with computer devices such as personal computers, data prepared with another computer having a different application software or with commercially available software from a different software manufacturer cannot be taken in as it is, and therefore, after being printed out with a printer, it is inputted from the keyboard into the computer device with which it is to be used. In addition, when a personal computer network is utilized to give and take document data, only the character data can be handled due to the restrictions by the operating system or the application software.

SUMMARY OF THE INVENTION

Having been provided in consideration of such conventional situation, this invention intends to offer a smart peripheral which can take in the output data from an external input device and can generate a general-purpose import file that can be processed with a computer device without being restricted by the operating system, application software, or other.

Thus, this invention allows a communications network or local area network to be constructed for freely giving and taking data by communications, etc. without being subjected to the restrictions on the system or for freely printing out data on a printer regardless of the difference in printer control language.

BRIEF DESCRIPTION OF THE DRAWINGS

FIG. 1 illustrates the smart peripheral connected to the computer devices, printer, and other peripherals for operation.

DETAILED DESCRIPTION OF THE INVENTION

Figure 2:
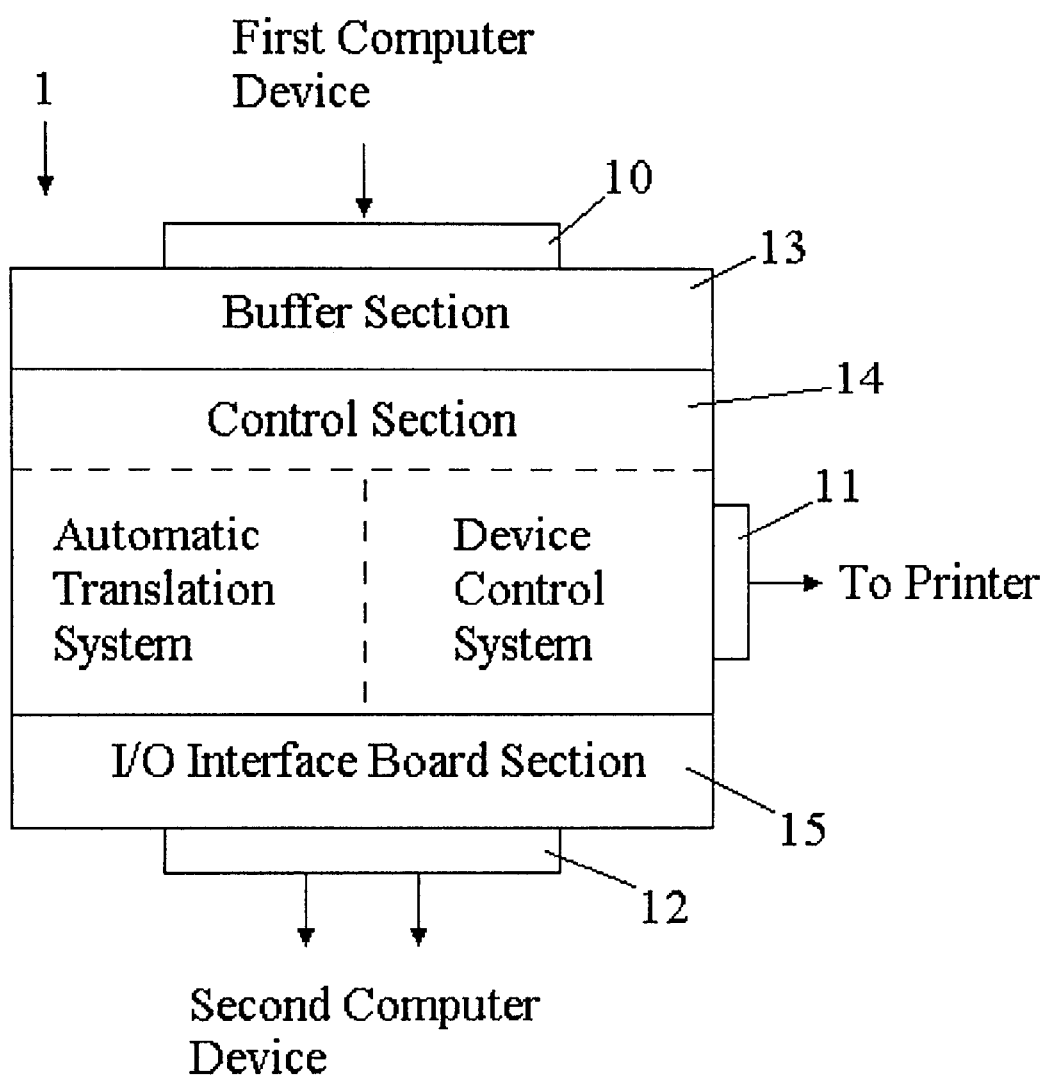
FIG. 2 is a block diagram of the smart peripheral.

To achieve the above purpose, the smart peripheral offered by this invention features having a general-purpose input/output interface; being connected between two computer devices adopting different types of operating system and/or application software; and taking in the output data from the first computer device to automatically translate the output data into general-purpose input data which can be processed with the application software which is used with the second computer device.

Further, as a form of the smart peripheral of the present invention, a printer can be connected in addition to the two computer devices, and the output data taken in from the first computer device can be automatically translated into general-purpose printer data that can be processed with the printer control language adopted by the said printer. This processing is executed by selecting the printer output mode, and the general-purpose printer data automatically generated is output to the printer as it is.

Referring to FIG. 2, the smart peripheral of the present invention that effects the processing, is provided, as a particular configuration, with an input/output interface section consisting of input and output interfaces 10, 11 and 12 each having at least one port; a buffer section 13 temporarily storing the output data taken in; a control section 14 having at least an automatic translation system and a device control system resident in the internal memory; and an input/output interface board section 15 for expansion slot connection. Generally, this input/output interface board section is connected or inserted into the expansion slots in the computer device for operation.

Further, the smart peripheral of the present invention can be connected to other peripherals such as a communications modem and fax modem. Therefore, the smart peripheral of the present invention can be incorporated in other peripherals, such as a printer, plotter, plotter buffer, communications modem, fax modem, hard disk storage, to be sold in the form of these peripherals.

The smart peripheral of the present invention can be loaded with a communication control chip to process fax and data communications, and with a hard disk having a storage capacity of 200 MB or over, and other devices, while the buffer section generally consists of a RAM with a storage capacity of 1 MB or over. For connection of the smart peripheral with computer devices and a printer, either an interface cable or an input/output interface device for radio communications can be adopted.

The term "computer devices" used here include computers, such as super computers, minicomputers, workstations, personal computers, and word processors, and other applied products.

The term "automatic translation" means the function which automatically determines the format of the data taken in, and automatically generates the general-purpose import file that can be processed by the application software in the second computer device, or automatically converts the data taken in into general-purpose printer data that can be processed with the printer control language adopted by the printer.

The processable data as an object for the smart peripheral of the present invention is printer output data or file stated in the printer control language that is disclosed and output data or file in a format other than that for the printer control language. The data that can be taken in from the general-purpose input/output interface is printer output data and communication output data.

As the interface provided for the device of the present invention, the industry standard interfaces, such as Centronics parallel interface established by Centronics in USA and RS-232-C established by the Electronic Industries Association can be used, and either of these interfaces is adopted by commercially available printers or input/output equipment.

The printer control language as an object for the device of the present invention can be any one of the printer control languages for all commercially available printers whose specifications are disclosed. The Hewlett-Packard HP-PCL and HP-GL, NEC PC-PR201, Epson ESC/P, and CANON LIPS-II and LIPS-III are examples of printer control language whose specifications are disclosed.

The function of each invention configured as stated above will be described here.

As shown in FIG. 1, the smart peripheral 1 of the present invention has a general-purpose input/output interface, and is, being connected between two computer devices adopting different types of operating system and/or application software, i.e., the first computer device 2 and the second computer device 3, and, as required, to the printer 4. The device of the present invention can be further connected to other peripherals 5, such as a communications modem and fax modem.

Operation of this smart peripheral 1 is made on the previously given instructions from the second computer device 3. The output data prepared and stored by the first computer 2 is taken in regardless of the application software, and the automatic translation mechanism in the control section of the smart peripheral 1 automatically determines the format of the data taken in before automatically generating general-purpose input data that can be processed with the application software used with the second computer device 3.

The general-purpose input data automatically generated by the smart peripheral 1 can be directly data-inputted, without being subjected to the restrictions on the system, by the computer device which adopts application software having an external file inputting capability. Therefore, this general-purpose input data automatically generated is temporarily stored in the smart peripheral 1.

As a result of this, the second computer device 3 can take in the general-purpose input data to further process and edit this general-purpose input data before file-inputting it in the hard disk, etc., and in addition, the printer provided for the second computer device 3 printing it out.

The smart peripheral 1 of the present invention uses the automatic translation mechanism in the control section to automatically determine the format for the output data taken in from the first computer device 2 before automatically converting it into general-purpose printer data that can be processed with the printer control language adopted by the connected printer 4. The general-purpose printer data automatically converted can be output to the printer 4 as printer output data on the instructions by the second computer device 3. Thus, printer data for application software which is not compatible with the printer control language for the printer used can be printed out as it is.

The general-purpose input data automatically generated by the smart peripheral consists of complete data including information, such as enlargement or reduction of characters, rules, graphics, and graphs, as well as standard character data, desired. By generating such general-purpose data, it is possible to build an external input mechanism which provides the WYSIWYG method that displays a document on the screen in the form as printed out.

The user, can prepare an automatic translation mechanism (user-defined import-file generating system) in conformity with individual application programs whose data formats are disclosed, and by registering it in the control section of the smart peripheral of the present invention, the user can provide automatic generation of data only for a given application program from the general-purpose input data automatically prepared.

Further, by registering in the control section of the present invention an automatic translation mechanism which is compatible with an application program for a word processor or DTP for multilanguage, such as English, Japanese, and Chinese, whose internal data-format is disclosed, general-purpose input data which can be processed only by the application program can be automatically generated.

By referring to the drawings attached, the preferred embodiments of the smart peripheral related to this invention will be described in detail here.

Preferred Embodiment 1

A smart peripheral which is a preferred embodiment of the present invention is provided with a Centronics parallel interface for input with more than one port and a Centronics parallel interface for output with more than one port; a buffer section equipped with an 1 MB RAM; a control section having an automatic translation system and a device control system resident in the internal memory of a single chip CPU; a modem chip for communications control; a storage device equipped with a hard disk of over 200 MB; and an input/output interface board section for expansion slot connection.

The automatic translation in the device of the present invention automatically determines the format for the output data taken in, in accordance with the software loaded in the control section, and automatically generates general-purpose input data that can be processed with the application software used with the computer device for operating the device of the present invention.

The Centronics parallel interface for input in the device of the present invention was cable-connected to the expansion printer output port for a Toshiba Rupo; the Centronics parallel interface for output was cable-connected to an Epson ink-jet printer MJ-1050V2; and further, the interface for expansion slot connection was connected to the expansion slots in the personal computer IBM PS/V MASTER 3411/NPW.

The printer data for the Toshiba Rupo is that in the format in conformity with the NEC PC-PR201, while the operating system for the IBM personal computer was MS DOS Ver. 4.0 and the application software was the NOVELL English word processor WordPerfect Ver. 5.2J.

Document data (a Japanese, A4-size, three-page invitation letter for introduction of a new product) was output to the device of the present invention from the Toshiba Rupo. The device of the present invention temporarily stored the document data taken in in the buffer section, and then automatically determined, through the automatic translation mechanism in the control section, that the printer format was the NEC PC-PR201, before using the document data to automatically generate general-purpose import data that can be processed with the WordPerfect Ver. 5.2J used with the IBM personal computer.

Then, the WordPerfect Ver. 5.2J in the IBM personal computer was activated, and the external file input mechanism in the IBM personal computer was used to file-input the general-purpose input data automatically generated in the device of the present invention. The general-purpose data was screen-displayed, and the Wordperfect Ver. 5.2J was used to edit an English document for preparing a bilingual invitation for introducing the new product.

Finally, the document was stored in the hard disk in the IBM personal computer, and by operating the IBM personal computer, it could be printed out with the ink-jet printer MJ-1050V2.

Preferred Embodiment 2

With the use of the device of the present invention that has the same configuration as the preferred embodiment 1, the expansion printer output port in the personal computer NEC PC-9821AP3 was cable-connected to the Centronics parallel interface for input; the CANON page printer LBP-A304G2 was cable-connected to the Centronics parallel interface for output; and the interface board for expansion slot connection was connected to the expansion slots in the personal computer COMPAQ PRESARIO CDS520.

The NEC PC-9821AP3 had adopted the MS-DOS Ver. 5.0 as the operating system, and the ASCII simplified type CAD system CANDY5 as the application software. The COMPAQ PRESARIO CDS520 was configured so that the operating system was the MS-WINDOWS Ver. 3.0A and the application software the Aldus DTP system Aldus PageMaker Ver. 4.0J.

After a guide map for the new business office was prepared by using the NEC PC-9821AP3, the data of the invitation was output from the NEC PC-9821AP3 to the device of the present invention. The device of the present invention temporarily stored the document data taken in in the buffer section, and then automatically determined, through the automatic translation mechanism in the control section, that the printer format was the CANON LIPS-III, before using this data to automatically generate general-purpose input data that can be processed with the Aldus PageMaker used with the COMPAQ PRESARIO CDS520.

Then, the Aldus PageMaker in the COMPAQ PRESARIO CDS520 was activated, and the external file input mechanism in the COMPAQ PRESARIO CDS520 was used to file-input the general-purpose input data automatically generated in the device of the present invention. The general-purpose data was screen-displayed, and the Aldus Page-Maker was used to edit a mapped invitation to the party for opening the business office.

Finally, the document was stored in the hard disk in the COMPAQ PRESARIO CDS520, and by operating the COMPAQ PRESARIO CDS520, it could be printed out with the CANON page printer LBP-A304G2.

Preferred Embodiment 3

With the use of the device of the present invention that has the same configuration as the preferred embodiment 1, the printer output port in the personal computer COMPAQ PRESARIO CDS520 was cable-connected to the Centronics parallel interface for input; the NEC page printer PC-PR20004W was cable-connected to the Centronics parallel interface for output; and the interface board for expansion slot connection was connected to the expansion slots in the personal computer NEC PC-9821AP3.

The COMPAQ PRESARIO CDS520 was configured so that the operating system was the MS-WINDOWS Ver. 3.0A and the application software the Microsoft English word processor WORD. The NEC PC-9821AP3 had adopted the MS-WINDOWS Ver. 3.1 as the operating system, and the Just System Japanese word processor Ichitaro Ver. 6 as the application software.

After the printer output mode in the NEC PC-9821AP3 was selected, the COMPAQ PRESARIO CDS520 was used to prepare an English document for informing of the international conference being held before the English document (A4-size, ten pages) was data output from the COMPAQ PRESARIO CDS520 to the device of the present invention. The device of the present invention temporarily stored the document data taken in in the buffer section, and then automatically determined, through the automatic translation mechanism in the control section, that the printer format was the HP-PCL5, before automatically converting the printer format into a format that can be processed, and printing out the document data with the NEC page printer PC-PR20004W (printer control language N-PDL) as it is.

Thus, by connecting the computer devices to each other through the device of the present invention, even the NEC page printer having a different printer control language could make a print-out without the need for exchanging it with a printer which has an identical printer control language.

Preferred Embodiment 4

With the use of the device of the present invention that has the same configuration as the said preferred embodiment 1, the expansion printer output port in the personal computer NEC PC-9821AP3 was cable-connected to the Centronics parallel interface for input; the Omron fax communications modem ME2496P II-W was cable-connected to the Centronics parallel interface for output. Further, one of the interface boards for expansion slot connection was connected to the expansion slots in the personal computer COMPAQ PRESARIO CDS520, while the other was connected to the CANON page printer LBP-A304G2.

The NEC PC-9821AP3 had adopted the MS-DOS Ver. 5.0 as the operating system, and the ASCII simplified type CAD system CANDY5 as the application software. The COMPAQ PRESARIO CDS520 was configured so that the operating system was the MS-WINDOWS Ver. 3.0A and the application software was the Aldus DTP system Aldus PageMaker Ver. 4.0J with unique fax communications software being incorporated.

After a guide map for the new business office was prepared by using the NEC PC-9821AP3, the data of the invitation was output from the NEC PC-9821AP3 to the device of the present invention. The device of the present invention temporarily stored the document data taken in in the buffer section, and then automatically determined, through the automatic translation mechanism in the control section, that the printer format was the CANON LIPS-III, before using this data to automatically generate general-purpose input data that can be processed with the Aldus PageMaker used with the COMPAQ PRESARIO CDS520.

Then, the Aldus PageMaker in the COMPAQ PRESARIO CDS520 was activated, and the external file input mechanism in the Aldus PageMaker was used to file-input the general-purpose input data automatically generated in the device of the present invention. The general-purpose data was screen-displayed, and the Aldus PageMaker was used to edit a mapped invitation to the party for opening the business office.

Finally, the document was stored in the hard disk in the COMPAQ PRESARIO CDS520, and by activating the fax communications software in the COMPAQ PRESARIO CDS520, the invitation to the party for opening the business office could be faxed through the fax communications modem. Finally, the document could be printed out with the CANON page printer LBP-A304G2.

What is claimed is:

1. A smart peripheral device comprising:
    a first interface for connecting to a printer output port of a first computer device and for receiving first printer data of a first printer format from said printer output port of said first computer device;
    a second interface for connecting to an input/output port of a second computer device containing predetermined application software;
    a control means for automatically determining said first printer format of said first printer data, for automatically translating said first printer data into a general purpose import file which is compatible with said application software of said second computer device, and for outputting said general purpose import file via said second interface to said second computer device.

2. A smart peripheral device as claimed in claim 1, wherein said first interface is a parallel interface.

3. A smart peripheral device as claimed in claim 2, wherein said application software is word processing software.

4. A smart peripheral device as claimed in claim 1, further comprising a third interface for connecting to a printer device, wherein said control means is responsive to said second computer device to output second printer data of a second printer format via said third interface, said second printer format being compatible with said printer device and different than said first printer format.

5. A smart peripheral device as claimed in claim 4, wherein said first and third interfaces are parallel interfaces.

6. A smart peripheral device as claimed in claim 4, wherein said application software is word processing software.

7. A smart peripheral device as claimed in claim 5, wherein said application software is word processing software.

8. A smart peripheral device as claimed in claim 1, wherein said control means includes an automatic translation section which automatically determines said first printer format of said first printer data and automatically translates said first printer data into said general purpose import file.

9. A smart peripheral device as claimed in claim 1, wherein said application software is word processing software.

10. A computer network comprising:
    a first personal computer, having a printer output port and first application software, for outputting first printer data of a first printer format on said printer output port in accordance with said first application software;
    a second personal computer, having an input/output port and second application software which is different from said first application software, for processing a general purpose import file received on said input/output port using said second application software; and,
    a smart peripheral device which is operatively interposed between said first and second personal computers, and which includes (a) a first interface for connecting to said printer output port of said first personal computer and for receiving said first printer data of said first printer format from said printer output port of said first personal computer, (b) a second interface for connecting to said input/output port of said second personal computer, and (c) a control means for automatically determining said first printer format of said first printer data, for automatically translating said first printer data into said general purpose import file which is compatible with said second application software of said second personal computer device, and for outputting said general purpose import file via said second interface to said second personal computer.

11. A computer network as claimed in claim 10, wherein said first interface is a parallel interface.

12. A computer network as claimed in claim 10, further comprising a printer for printing second printer data of a second printer format which is different from said first printer format, wherein said smart peripheral device further includes a third interface connected to said printer, and wherein said control means is responsive to said second personal computer to output said second printer data via said third interface.

13. A computer network as claimed in claim 12, wherein said first and third interfaces are parallel interfaces.

14. A computer network as claimed in claim 12, wherein said first and second personal computers have respectively different operating systems.

15. A computer network as claimed in claim 14, wherein said second application software is word processing software.

16. A computer network as claimed in claim 12, wherein said second application software is word processing software.

17. A computer network as claimed in claim 10, wherein said first and second personal computers have respectively different operating systems.

18. A computer network as claimed in claim 17, wherein said second application software is word processing software.

19. A computer network as claimed in claim 10, wherein said second application software is word processing software.

20. A computer network as claimed in claim 10, wherein said control means, of said smart peripheral device, includes an automatic translation section which automatically determines said first printer format of said first printer data and automatically translates said first printer data into said general purpose import file.

\* \* \* \* \*